United States Patent [19]

Morin et al.

[11] Patent Number: 5,123,939
[45] Date of Patent: Jun. 23, 1992

[54] CYCLONE FOR SEPARATING A MIXTURE OF GAS AND SOLID PARTICLES BY CENTRIFUGING, WITH HEAT RECOVERY

[75] Inventors: Jean-Xavier Morin, Neuville aux Bois; Jean Aubry, Le Plessis Robinson; Jean-Paul Tessier, Paris, all of France

[73] Assignee: Stein Industrie, Velizy-Villacoublay, France

[21] Appl. No.: 786,840

[22] Filed: Nov. 1, 1991

[30] Foreign Application Priority Data

Nov. 7, 1990 [FR] France ............................... 90 13801

[51] Int. Cl.⁵ ............................................. B01D 45/12
[52] U.S. Cl. ..................................... 55/218; 55/269; 55/390; 55/459.1; 55/474
[58] Field of Search ................. 55/82, 99, 211, 218, 55/269, 319, 390, 459.1, 474

[56] References Cited

U.S. PATENT DOCUMENTS

| | | | |
|---|---|---|---|
| 3,443,360 | 5/1969 | Reeves | 55/269 X |
| 4,225,325 | 9/1980 | Diehl et al. | 55/191 |
| 4,778,488 | 10/1988 | Koers | 55/459.1 X |
| 4,853,003 | 8/1989 | Dewitz | 55/20 |
| 4,913,711 | 4/1990 | Stewart | 55/269 |
| 4,944,250 | 7/1990 | Seshamani | 123/20 B |

FOREIGN PATENT DOCUMENTS

| | | |
|---|---|---|
| 955889 | 1/1957 | Fed. Rep. of Germany . |
| 108710 | 8/1916 | United Kingdom . |
| 2159442 | 5/1984 | United Kingdom . |

*Primary Examiner*—Charles Hart
*Attorney, Agent, or Firm*—Sughrue, Mion, Zinn, Macpeak & Seas

[57] ABSTRACT

A cyclone for separating a mixture of gas and solid particles by centrifuging into a fraction that is enriched in particles and a gaseous fraction that is depleted in particles, the cyclone comprising a cylindrical vessel into which a duct for injecting the mixture of gas and solid particles opens out tangentially, an axial duct for removing the gaseous fraction, means for removing the fraction that is enriched in particles, which means are situated in the bottom portion of the cylindrical vessel, gas injection means serving to fluidize the solid particle enriched fraction as a dense bed, and heat exchanger means for exchanging heat between the dense fluidized bed that is formed and a fluid to be vaporized and/or reheated, together with means for adjusting the level of the dense bed.

4 Claims, 2 Drawing Sheets

CYCLONE FOR SEPARATING A MIXTURE OF GAS AND SOLID PARTICLES BY CENTRIFUGING, WITH HEAT RECOVERY

FIELD OF THE INVENTION

The present invention relates to a cyclone for separating a mixture of gas and solid particles by centrifuging into a fraction that is enriched in particles and a gaseous fraction that is depleted in particles, the cyclone comprising a cylindrical vessel into which a duct for injecting the mixture of gas and solid particles opens out tangentially, an axial duct for removing the gaseous fraction, means for removing the fraction that is enriched in particles, which means are situated in the bottom portion of the cylindrical vessel, gas injection means serving to fluidize the solid particles enriched fraction as a dense bed, and heat exchanger means for exchanging heat between the dense fluidized bed that is formed and a fluid to be vaporized and/or reheated, together with means for adjusting the level of the dense bed.

BACKGROUND OF THE INVENTION

Such a cyclone is described in Document U.S. Pat. No. 4,853,003 and provides preliminary cooling for the solid particles, thereby making it possible to reduce the heat exchange area within a circulating fluidized bed reactor when the reactor is coupled to the cyclone.

However that prior cyclone provides only imperfect separation of the solid particles.

SUMMARY OF THE INVENTION

In the cyclone of the present invention which improves this separation, the axial duct for removing the gaseous fraction passes through the bottom floor of the cylindrical vessel and its top edge is situated at a level which is significantly lower than the top of the cylindrical vessel but which is at a level that is higher than the outlet of the duct for injecting the mixture to be separated, thereby enabling three separation zones to be delimited.

In the cyclones of the present invention, the mixture of gas and particles is thoroughly centrifuged over its entire downwards travel because of the presence of the axial duct.

In addition, over the entire height between the outlet from the duct for injecting the mixture and the top of the axial duct, additional separation is obtained in which the concentration of particles is already very considerably less than it is at the inlet, and in which flows of gas and particles go in opposite directions.

The longer the axial duct, the lower the density of particles, whereas in the prior cyclone the density of particles is high at the duct opening.

Finally, in the empty space between the top of the gas removal duct and the top of the vessel, there is a zone where the radial velocity of the gas is low, and thus in which the particle entrainment effect is reduced.

It should be observed that in the prior cyclone, the radial speed is high at the inlet orifice to the axial duct for removing gas.

The cyclone of the present invention preferably also satisfies at least one of the following characteristics:

the heat exchanger means for exchanging heat between the dense fluidized bed and the fluid to be vaporized and/or reheated are constituted by tubes disposed in the annular chamber;

the axis of the duct for injecting the mixture of gas and solid particles has a negative slope relative to the horizontal, preferably at an angle lying in the range 0° to 15°; and the top end of the axial duct is sufficiently far from the top of the cylindrical vessel to co-operate therewith to delimit an expansion chamber for the mixture of gas and solid particles to be separated in the chamber.

BRIEF DESCRIPTION OF THE DRAWINGS

An embodiment of the invention is described by way of example with reference to the accompanying drawings, in which.

DETAILED DESCRIPTION

Figure 1:
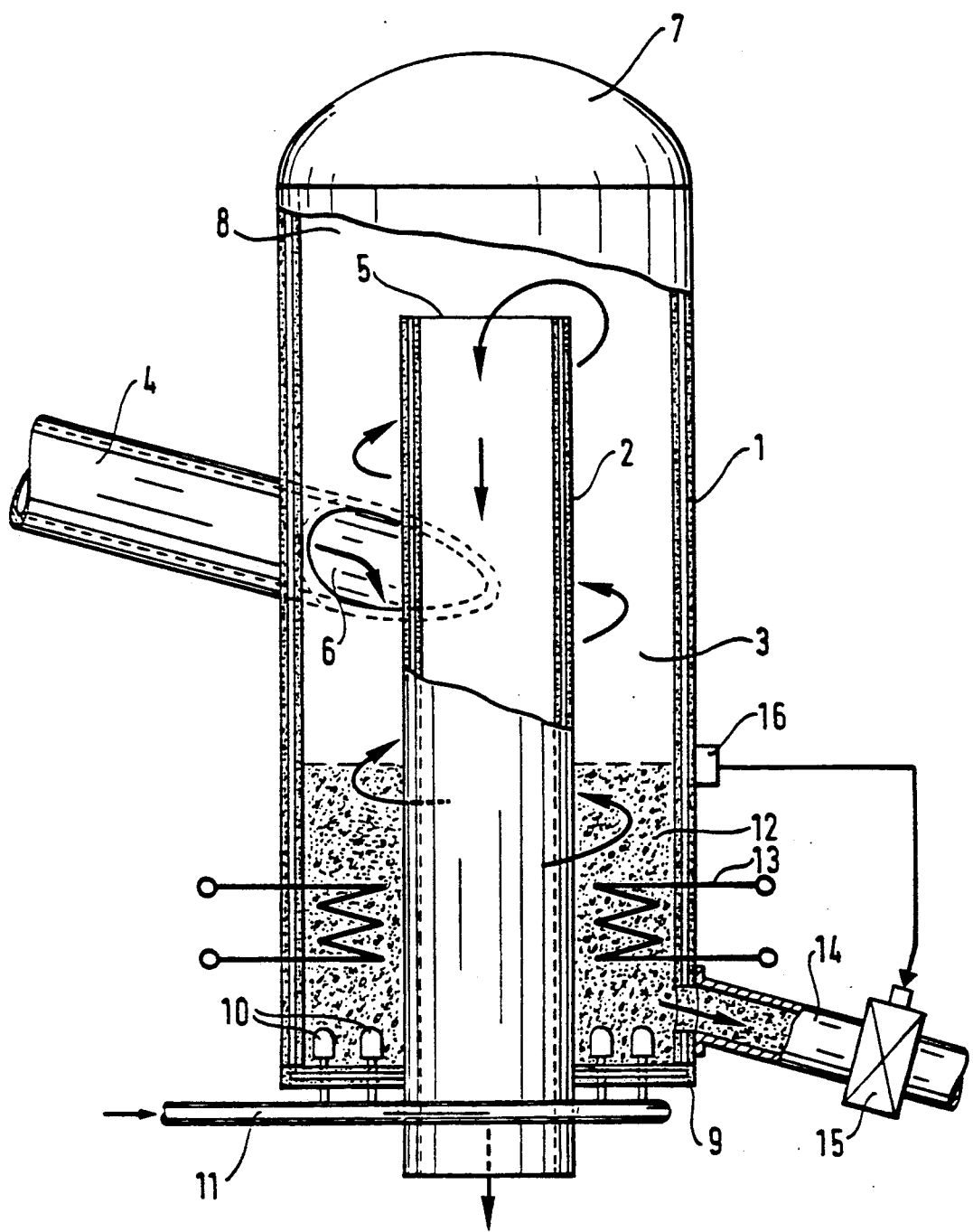
FIG. 1 is a section on a diametral plane.

In FIG. 1 the cyclone comprises an outer cylindrical vessel 1 and an axial duct 2 for removing gas depleted in solid particles, thereby delimiting an annular chamber 3. A downwardly sloping duct 4 at an angle α to the horizontal lying in the range 0° to 15°, serves to inject a mixture of gas and solid particles to be separated into the chamber 3.

The top edge 5 of the duct 2 for removing the separated gas is well above the outlet 6 from the duct 4, thereby providing a separation region between the level of the outlet 6 and the top edge 5, in which region the concentration of particles is low. Furthermore, the top edge 5 is at a considerable distance from the top 7 of the vessel 1, thereby providing an expansion chamber 8 in which the gas looses the major portion of its turbulent motion so as to penetrate axially into the removal duct 2.

The solid particles concentrate at the periphery of the vessel 1 and collect in the bottom of the annular space 3. The floor 9 of this annular space is provided with nozzles 10 that inject a fluidizing gas (typically recycled flue gases) arriving via a duct 11. A dense fluidized bed 12 of particles is formed over these nozzles 10. Heat exchanger tubes represented diagrammatically at 13 are immersed therein and recover a portion of the heat conveyed by the solid particles by exchanging heat with a fluid that flows in these tubes. The partially cooled solid particles are removed from the bottom of the annular space via a duct 14.

An adjustable valve 15 is disposed on the duct 14 and valve opening is controlled by a level detector 16 for detecting the level of the dense bed 12.

The level of the dense bed is adjusted so as to be considerably lower than the outlet 6 from the duct 4 while still being considerably higher than the tubes 13.

Figure 2:
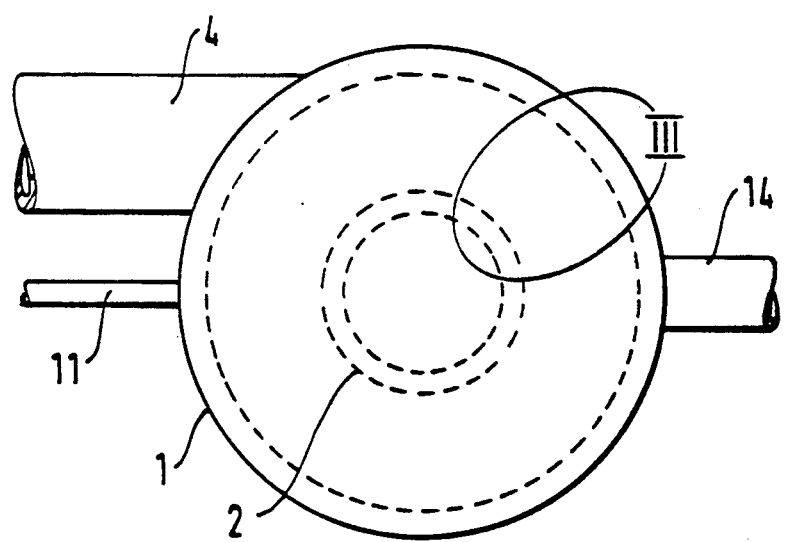
FIG. 2 is a fragmentary section on a horizontal plane.
Figure 3:
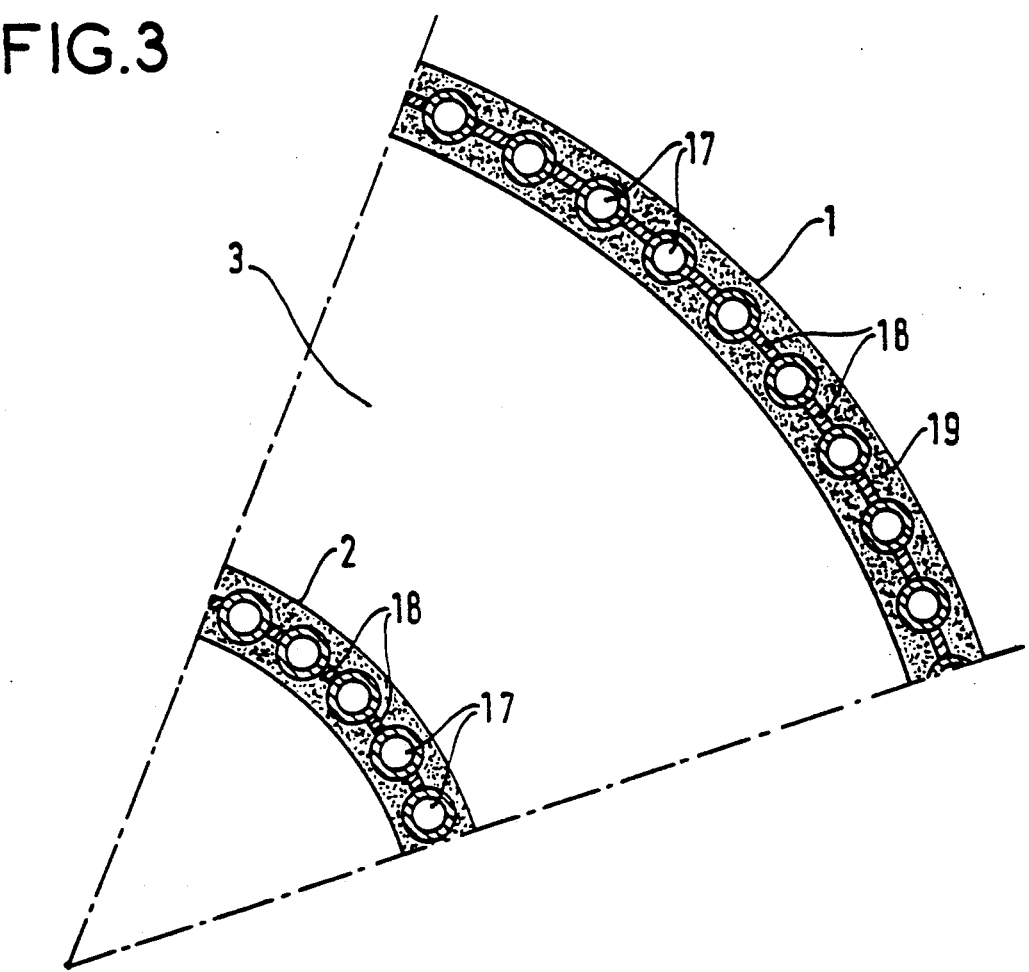
FIG. 3 shows a detail III of FIG. 2.

The walls of the vessel 1, of the floor 9, and of the removal duct 2 may optionally be constituted by tubes 17 conveying a coolant (see FIGS. 2 and 3). These tubes 17 are interconnected by fins 18 that are welded together and they are embedded in a layer 19 of cement that protects them from erosion by the solid particles. This disposition prevents phenomena of hot solid particles agglomerating on the walls.

To sum up, the cyclone of the present invention is constituted by three separation zones for the gas-particle mixture: a primary zone extending below the injection inlet (4) and above the dense phase where the major portion of separation takes place by gravity and by the centrifugal effect and by agglomeration; a secondary zone situated above the primary zone and extending up to the top of the outlet duct for purified gas, this secondary zone being characterized by the concentration of solids therein falling off as a function of height, with separation taking place likewise by gravity and by centrifugal effects; and a tertiary zone at the top of the apparatus where gas speed is suddenly reduced which has the effect of limiting particle entrainment.

We claim:

1. A cyclone for separating a mixture of gas and solid particles by centrifuging into a fraction that is enriched in particles and a gaseous fraction that is depleted in particles, the cyclone comprising a cylindrical vessel into which a duct for injecting the mixture of gas and solid particles opens out tangentially, an axial duct for removing the gaseous fraction, means for removing the fraction that is enriched in particles, which means are situated in the bottom portion of the cylindrical vessel, gas injection means serving to fluidize the solid particle enriched fraction as a dense bed, and heat exchanger means for exchanging heat between the dense fluidized bed that is formed and a fluid to be vaporized and/or reheated, together with means for adjusting the level of the dense bed, wherein the axial duct for removing the gaseous fraction passes through the bottom floor of the cylindrical vessel and its top edge is situated at a level which is significantly lower than the top of the cylindrical vessel but which is at a level that is higher than the outlet of the duct for injecting the mixture to be separated, thereby enabling three separation zones to be delimited.

2. A cyclone according to claim 1, wherein the axis of the duct for injecting the mixture of gas and solid particles has a negative slope relative to the horizontal, preferably at an angle lying in the range 0° to 15°.

3. A cyclone according to claim 1, wherein the top end of the axial duct is sufficiently far from the top of the cylindrical vessel to co-operate therewith to delimit an expansion chamber for the mixture of gas and solid particles to be separated.

4. A cyclone according to claim 1, wherein the walls of the cylindrical vessel and of the axial removal duct are constituted by walls of tubes which are interconnected by welded-together fins.

* * * * *